Jan. 19, 1960   F. W. HOLST ET AL   2,921,484
SAW SHARPENING APPARATUS
Filed Nov. 28, 1958   3 Sheets-Sheet 1
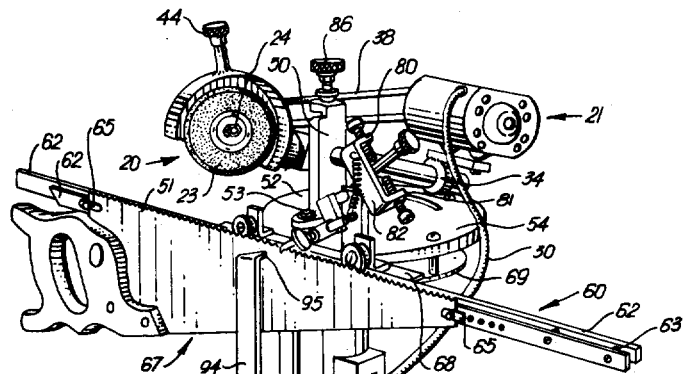
FIG.1
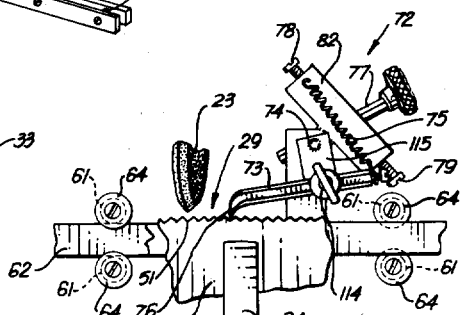
FIG.3
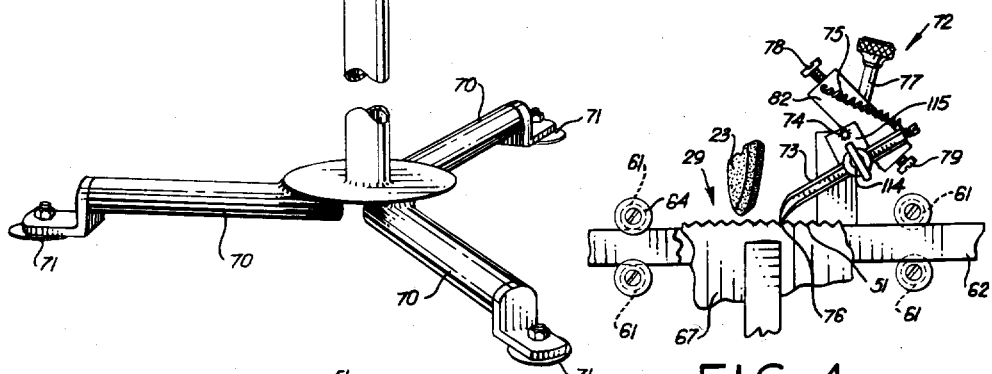
FIG.4
FIG.2
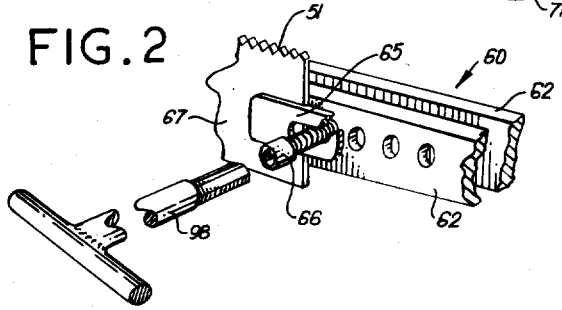
INVENTORS
Fred W. Holst
Anna D. Holst

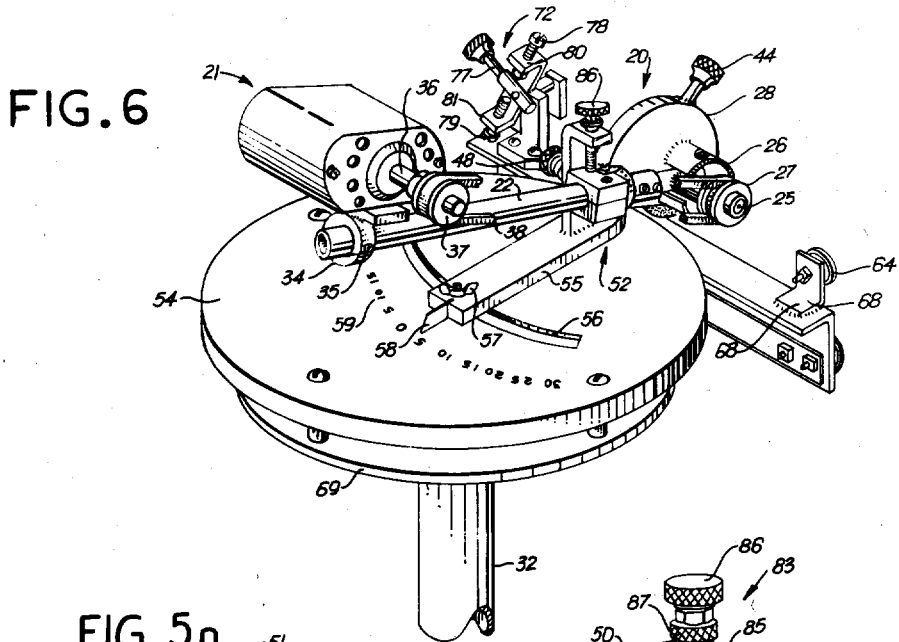
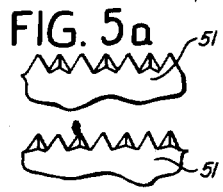
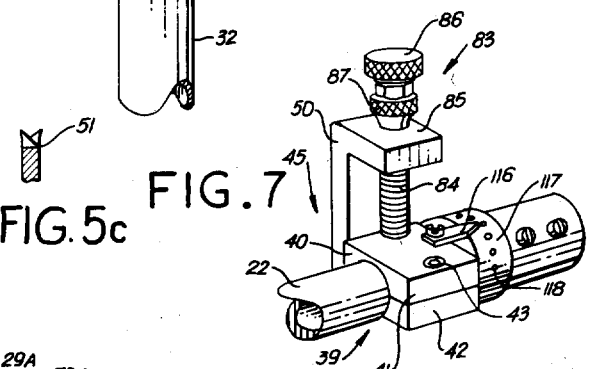
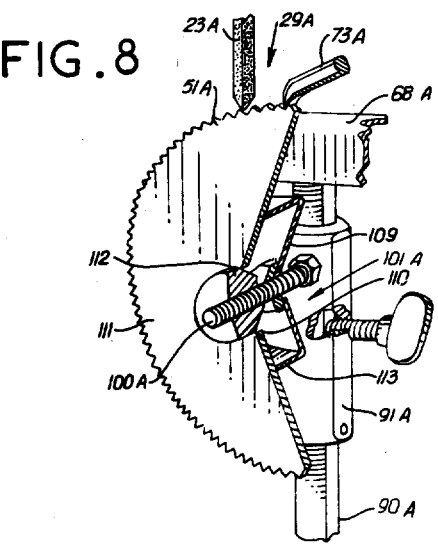

INVENTORS.
Fred W. Holst
Anna D. Holst

United States Patent Office 2,921,484
Patented Jan. 19, 1960

2,921,484

SAW SHARPENING APPARATUS

Fred W. Holst and Anna D. Holst, Torrance, Calif.

Application November 28, 1958, Serial No. 776,812

3 Claims. (Cl. 76—40)

Generally speaking, the present invention relates to the saw sharpening art and, more particularly, pertains to an improved saw sharpening apparatus of very simple, lightweight, and easily portable construction adapted to effectively mount various types of longitudinal and/or circular saws for optimum sharpening of each saw tooth along the saw tooth edge of any of said saws. In other words, the improved saw sharpening apparatus of the present invention is not only lightweight and readily portable, but is virtually universally adaptable for sharpening substantially any type of saw tooth carried by substantially any type of saw. This is made possible by reason of novel mounting means of relatively simple, cheap, and foolproof construction adapted to effectively mount motor-driven grinding wheel means for three types of differently directed rotative movement with respect to a portion of a saw tooth edge of a saw mounted in a saw tooth sharpening region by the apparatus, whereby to make it possible to appropriately grind and sharpen saw teeth of various widths, heights, spacing, and shape and to do so irrespective of whether the saw teeth are substantially coplanar or are intermittently oppositely inclined with respect to each other, as is commonly found in certain prior art types of saws. Furthermore, the improved saw sharpening apparatus of the present invention is well adapted for sharpening longitudinal saws, circular saws, or saws of virtually any desired shape.

With the above points in mind, it is an object of the present invention to provide an improved saw sharpening apparatus of relatively lightweight, simple, cheap, and foolproof construction adaptable for sharpening saws of virtually any shape and having virtually any type of saw tooth edge.

Other and allied objects will be apparent to those skilled in the art after a careful study of the accompanying illustrations, the present specification, and the appended claims.

To facilitate understanding, reference will be made to the hereinbelow-described drawings, in which:

Fig. 1 is a perspective view of one illustrative example of the invention shown mounting a conventional longitudinal saw with an intermediate portion of the saw tooth edge thereof in a saw tooth sharpening region and with the grinding wheel means shown in a position prior to pivotal movement downward into engagement with a portion of a saw tooth edge for sharpening same;

Fig. 2 is an enlarged fragmentary perspective view of a right side portion of the saw mounting means adapted to fasten the right end of the saw shown in Fig. 1 to the longitudinal horizontal carriage member shown in Fig. 1, and shows the adjusting wrench for fastening and unfastening the socket head screw in exploded relationship with respect thereto;

Figure 10:
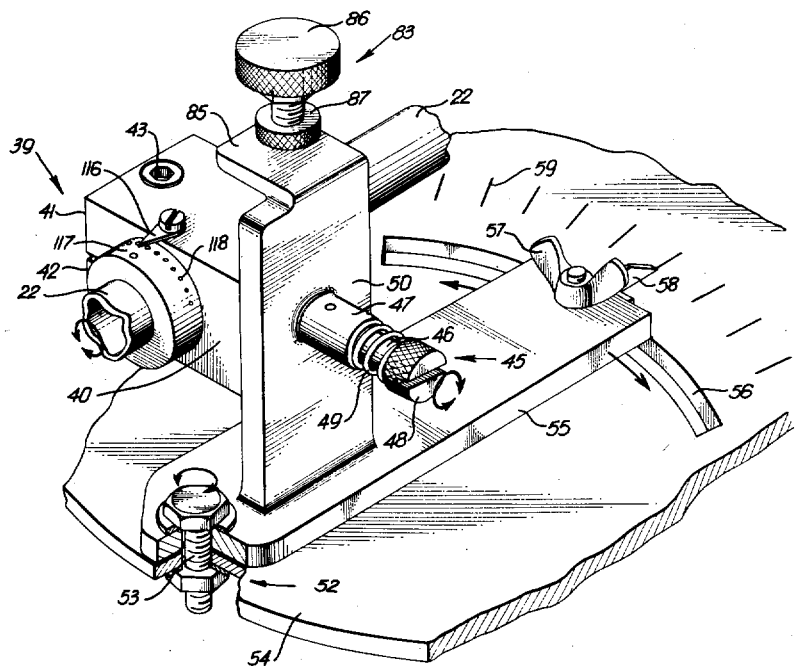

Fig. 3 is an enlarged fragmentary elevational view of the central portion of Fig. 1 showing an intermediate portion of the saw, an intermediate portion of the horizontal longitudinal carriage member, a fragment of the grinding wheel means, and showing in elevation saw tooth edge advancing means adapted to intermittently successively move the saw and the horizontal carriage member toward the left as viewed in Fig. 1 after each saw tooth sharpening operation; said saw tooth advancing means being shown in Fig. 3 immediately after operation thereof for advancing the saw tooth edge of the saw toward the left;

Fig. 4 is a view similar to Fig. 3 but shows the saw tooth edge advancing means in the position it assumes immediately before manual operation for the purpose of advancing the saw tooth edge of the saw toward the left; this view also shows the fragment of the grinding wheel means in an oppositely inclined position for grinding a second set of every other pair of opposed saw teeth in the opposite direction from the grinding of a first set of every other pair of opposed saw teeth when the grinding wheel is in the position shown in Fig. 3;

Fig. 5a illustrates a fragment of a saw tooth edge of one type of saw, showing in elevation the back or ungrounded surfaces of four intermittent saw teeth of a first set of saw teeth, and showing intermittently positioned therebetween the doubly ground front surfaces of three saw teeth of a second set of said saw teeth;

Fig. 5b is a rear elevational view of Fig. 5a;

Fig. 5c is a right end view of Fig. 5a with the lower portion thereof comprising a part of the saw blade being shown in section;

Fig. 6 is a fragmentary perspective view of the upper portion of the improved saw sharpening apparatus of Fig. 1, as viewed from a position behind the apparatus in Fig. 1 and with certain portions removed or broken away for clarity, and further showing the grinding wheel means pivoted downwardly into a saw tooth sharpening region;

Fig. 7 is an enlarged fragmentary, partly broken-away, perspective view of a portion of Fig. 6, showing a portion of the mounting means which effectively mounts the longitudinal interconnecting member carrying the grinding wheel means and the electric motor means, for manually controlled rotation thereof about the longitudinal axis of said interconnecting member and for manually controlled substantially vertical pivotal movement of said interconnecting member and the grinding wheel means toward and away from the saw tooth sharpening region;

Fig. 8 is a fragmentary perspective view, with certain portions broken away, of a central portion of the apparatus shown in Fig. 1 when carrying a circular saw (shown partially cut away) rather than a straight saw as illustrated in Fig. 1;

Fig. 9 is a fragmentary enlarged perspective view illustrating another type of saw tooth from that illustrated in Figs. 5a, 5b, and 5c; and Fig. 10 is a fragmentary enlarged view, partly broken-away and partly in vertical section, showing in greater detail the portion of the mounting means referred to in this application as the second pivot means and also the portion of the mounting means referred to in this application as the third pivot means; it being understood that certain portions of the structure not necessary for an understanding of said second and third pivot means are removed for purposes of drawing simplification and clarity.

The improved saw sharpening apparatus of the present invention includes grinding wheel means, such as is generally indicated at 20, motor means, such as is generally indicated at 21, and an interconnecting member, such as is indicated at 22, rotatably carrying the grinding wheel means 20 and also carrying the motor means 21 in drivingly coupled relationship to the grinding wheel means 20. In the specific example illustrated, the grinding wheel means indicated generally at 20 comprises an abrasive grinding wheel disc 23 adapted to be removably fastened by suitable fastening means 24 to a shaft 25 mounted in suitable bearings within an enclosing housing 26; said shaft 25 being provided with a pulley sheave 27 for purposes which will be described hereinafter. It should also be noted that, in the specific embodiment illustrated, the grinding wheel means indicated generally at 20, also includes a partially enclosing flanged housing 28 for the grinding wheel disc 23 connected to the smaller housing 26 and provided with an actuating handle 44 adapted for use in upwardly and downwardly actuating the entire grinding wheel means 20 into and out of saw tooth grinding position with respect to a saw tooth sharpening region indicated generally at 29 (best seen in Figs. 3 and 4).

Also, in the specific example illustrated, the motor means 21 referred to above comprises an electric motor adapted to be energized through a suitable two wire electric cord 30 and switch means 31 mounted on the vertical upright central standard 32 carrying the entire saw sharpening apparatus; it being understood that the male electrical connector 33 at the end of the electric cord 30 is adapted to be connected to a suitable female electrical outlet in a conventional manner.

Also, in the specific example illustrated, the electric motor 21 is mounted on the interconnecting member 22 by means of a centrally apertured cylindrical collar or bushing 34 threadedly carrying a set screw 35 therein for tightening against the longitudinal tubular interconnecting member 22 when the electric motor 21 is initially mounted thereon. It should also be noted in the specific example illustrated, that the driven shaft 36 of the electric motor 21 is provided with a pulley sheave 37 and that the hereinbefore-mentioned drivingly coupled relationship of the motor 21 to the grinding wheel means 20 is accomplished by coupling means, which in this specific example comprises the two pulley sheaves 37 and 27 and the coupling belt means 38 carried thereby and effectively interconnecting same.

It should be noted that the longitudinal interconnecting tubular member 22, which effectively carries the grinding wheel means 20 and the motor 21, is pivotally mounted by pivotal mounting means, such as is indicated generally at 39 (best seen in Fig. 7), which effectively mounts said interconnecting member 22 for manually controlled rotation around its longitudinal axis for adjusting the plane in which the grinding wheel means 20 lies.

In the specific example illustrated, the mounting means 39 may be said to comprise a first pivot means and includes a split journal member 40 having an upper portion 41 and a lower portion 42 fastened together by a recessed-socket screw 43, with the rear portion of the split journal member 40 being solid, whereby a portion of the longitudinal interconnecting member 22 may be effectively grasped between arcuate recesses in the upper and lower portions 41 and 42 of said split journal member 40 so as to effectively mount the interconnecting member 22 in the split journal member 40 in a manner allowing axial rotation of the interconnecting member 22, the grinding wheel means 20, and the motor 21 about an imaginary axis extending longitudinally through the center of the interconnecting member 22. This has the effect of making it possible for a user of the device to grasp the handle 44 and effectively rotate the interconnecting member 22 about its longitudinal axis and, therefore, simultaneously rotating the plane in which the grinding wheel means 20 lies, until the grinding disc 23 of the grinding wheel means 20 lies in a proper plane for grinding the teeth of any particular type of saw which is to be sharpened. The amount of rotation of the plane in which the grinding wheel means 20 lies is indicated by a pointer 116 carried by the split journal member 40 which cooperates with an encircling collar 117 carried immediately underneath the pointer 116 by the interconnecting member 22 and which bears on its surface indicating markings 118 circularly spaced therearound. It should be understood that the indicating markings 118 may be of the type shown or may actually bear numbers indicating the angular rotation of the interconnecting member 22 with respect to the split journal member 40, if desired. It should be noted that the fastening screw 43 may be so adjusted that the rotating operation just described will require the application of a predetermined amount of torque to the actuating handle 44, in which case the frictional engagement of the split journal 40 around the longitudinal interconnecting member 22 will be sufficient to maintain it in whatever position it has just been adjusted into until a subsequent longitudinal rotative adjustment is effected by the application of torque to the handle 44. On the other hand, if positive locking of the grinding wheel means 20, in any selected position after such adjustment around the axis of the interconnecting member 22 is desired, this may be accomplished by first loosening the screw 43 before such adjustment and then tightening it after such adjustment.

The mounting means referred to above also is adapted to effectively mount the interconnecting member 22 for manually controlled substantially vertical pivotal movement of the grinding wheel means 20 toward and away from the saw tooth sharpening region 29 (best seen in Figs. 3 and 4). In the specific example illustrated, this vertical pivotal mounting of the interconnecting member 22 is accomplished by what might be termed second pivot means indicated generally at 45 and including a substantially horizontal shaft 46 connected to the back end of the split journal member 40 and extending horizontally through an encompassing intermediate horizontal journal member 47 and provided with a head 48, a coil compression spring 49 positioned between the head 48 and the outer end of the horizontal intermediate journal member 47 whereby to resiliently bias the rear end of the split journal member 40 against the upstanding support member 50, which carries the horizontal journal member 47. This effectively mounts the interconnecting member 22 for vertical pivotal movement about the horizontal axis of the horizontal shaft 46.

This has the effect of making it possible for a user of the device to grasp the handle 44 for the purpose of moving the entire grinding wheel means 20 from the upper position shown in Fig. 1 downwardly toward a lower position just below that shown in Fig. 3 so that the disc 23 of the grinding wheel means 20 will actually engage opposed teeth of the saw edge 51 for the purpose of sharpening same intermittently and in succession, which may mean every other tooth in succession or every tooth in succession depending upon the type of saw teeth being sharpened.

The mounting means referred to above also acts to effectively mount the interconnecting member 22 for manually controlled rotation around a substantially vertical axis for correspondingly adjusting the plane in which the grinding wheel means 20 lies. In the specific example illustrated, the portion of the mounting means making possible this third type of rotative adjustment may be said to comprise third pivot means indicated generally at 52 and includes a vertical interconnecting pivot pin 53 positioned above a circular disc-like horizontal support plate 54 and pivotally fastening thereto a rear end portion of a substantially horizontally directed pivotal arm 55 positioned immediately above the support plate 54; it being noted that the vertical member 50 attached to the horizontal intermediate journal member 47 is integrally fastened to and positioned above the horizontally directed pivotal arm 55 whereby they rotate together about the pivot pin 53, thus causing the outer or free end of the horizontally directed pivotal arm 55 to move in an arcuate manner with respect to an arcuate slot 56, carried in the horizontal support plate 54, to any desired location, where said free end may be fastened by suitable threaded fastening means, comprising a wing nut and screw indicated at 57, which cooperates with the free end of the pivotal arm 55 and the arcuate slot 56 in the horizontal support plate 54 for locking said free end in any desired angular position, such as indicated by the position of the pointer 58 with respect to the arcuate angular scale 59 carried on the upper surface of the supporting plate 54. This has the effect of making it possible for a user of the device to horizontally pivotally adjust the position of the interconnecting member 22 and, therefore, the grinding wheel means 20, into any desired horizontal position, thus effectively and correspondingly adjusting the plane in which the grinding disc 23 of the grinding wheel means 20 lies for the purpose of making it possible to provide the correct inclination to the angular edge of each of the saw teeth 51 ground during a saw sharpening operation. This usually involves setting the grinding wheel disc 23 at a first angle, such as that shown in Fig. 3, and then intermittently grinding every other opposed pair of saw teeth 51 along the length of the saw 67, then reversing the angular inclination of the grinding wheel disc 23 in the opposite direction, in the general manner indicated in Fig. 4, and then intermittently grinding every other opposed pair of saw teeth 51 positioned between those previously ground when the grinding disc 23 was in the position shown in Fig. 3. This will provide properly ground symmetrical saw teeth of one well known prior art type such as is illustrated in front elevation in Fig. 5a, in rear elevation in Fig. 5b, and in right end elevation (partially in section) in Fig. 5c.

The present invention also includes saw mounting means adapted to effectively movably mount a saw to be sharpened with a saw tooth edge thereof positioned in a saw tooth sharpening region for intermittent movement of said saw tooth edge through said saw sharpening region for successive sharpening of a plurality of saw teeth along said saw tooth edge of said saw. In the specific example illustrated in Figs. 1-7, said saw mounting means includes a longitudinal substantially horizontal carriage member indicated generally at 60 and a plurality of flanged rollers 61 horizontally slidably mounting the carriage member 60. It should be noted that the carriage member 60 consists of two spaced members 62 fastened together by suitable spacers 63; said spaced members 62 being slidably mounted with respect to the rollers 61, by means of the flanges 64 at the forward edges of said rollers 61, which overlap the rear one of the two spaced members 62 forming the longitudinal carriage 60 whereby said carriage 60 will be effectively slidably horizontally retained by the multiple flanged rollers 61. It should also be noted that the front member 62 of the longitudinal carriage 60 is provided with spaced, and horizontally adjustable, fastening brackets 65 adjacent each end fastened by threaded socket screws 66 to the front member 62 of the carriage 60; said bracket members 65 being adapted to engage opposed portions at each end of a saw blade, indicated generally at 67, whereby said saw blade 67 may be clamped to the front member 62 of the horizontal carriage 60 with the saw tooth edge 51 of the saw blade 67 upwardly directed and lying with at least a portion thereof in the saw tooth sharpening region indicated at 29 in Fig. 3, so that the entire carriage 60 and saw 67 may be horizontally moved with respect to the rollers 61, which are rotatably carried by a fixed support member 68 attached to the horizontal disc-shaped member 54, thus making it possible for the saw 67, to be successively moved after each saw tooth sharpening operation accomplished by means of the grinding wheel means 20.

It should be noted that the disc 54 and an underlying disc 69 are effectively carried at the top of the central standard 32, which is provided at the bottom thereof with three horizontal legs 70 having vertically adjustable floor-contacting plates 71, whereby the entire device may be effectively supported in a level manner.

The apparatus of the present invention may also include saw tooth edge advancing means such as is indicated generally at 72, which is intermittently forcibly cooperable with succeeding saw teeth of a saw for intermittently successively advancing same through the saw tooth sharpening zone after each saw tooth sharpening operation. In the specific example illustrated, the saw tooth edge advancing means 72 consists of a pawl member 73 pivotally mounted at 114 to a member 115 which is connected to a pivot pin at 74, and having one end biased by a tension biasing spring 75 in a manner such as to normally bias an operating tip 76 of the pawl member 73 into engagement with the saw teeth 51; said pivot pin 74 being rigidly connected to an actuating handle 77, which is positioned between opposed ends 80 and 81 of a fixedly mounted bracket member 82, whereby the pawl 73 may be moved from pre-actuating position shown in Fig. 4 into fully actuated position shown in Fig. 3, which has the effect of moving the entire carriage 60 and saw 67 carried thereby a predetermined distance toward the left as viewed in Figs. 1, 3, and 4 through the saw tooth sharpening region 29. The saw tooth advancing means indicated generally at 72 includes adjusting means for adjusting the amplitude of each individual saw tooth advancing operation. In the specific example illustrated, this adjusting means includes two spaced screws 78 and 79 carried in said opposite end portions 80 and 81 of said bracket member 82, which is fixedly mounted with respect to the arcuate movement of the actuating lever 77, whereby said actuating lever 77 may be caused to strike the end of either of the screws 78 or 79 at any predetermined position, according to adjustment of said screws, so as to make it possible to advance the saw 67 and the saw teeth 51 toward the left after each saw tooth sharpening operation by a proper distance to correspond to either a one tooth advancement, a two tooth advancement, or any other desired advancement, and also to make it possible to adjust for teeth of different widths.

It should also be noted that the so-called second pivot means, best shown in Figs. 6 and 7 and comprising the intermediate horizontal journal member 47 and the shaft 46 therein, may additionally include adjusting means, such as is indicated generally at 83, for adjusting the amplitude of the vertical movement of the interconnecting member 22 and the grinding wheel means 20 into the saw sharpening region 29 to adjust for proper optimum sharpening of saw teeth of different height. In the specific example illustrated, this adjusting means 83 takes the form of a threaded screw shaft 84 threadedly downwardly directed through a horizontal portion 85 attached to the upstanding member 50, which may be vertically adjusted by an actuating knob 86 so that the lower end of the threaded shaft 84 may be positioned for abutment with the split journal member 40 at a point slightly offset from the horizontal axial position of the horizontal shaft 46 in the intermediate journal member 47, whereby to limit vertical pivotal movement of the interconnecting member 22 to any desired degree. The threaded shaft 84 may be provided with a lock nut 87 adapted to abut the member 85 for locking the adjusting threaded shaft 84 in any desired position.

The invention may also include saw blade stabilizing means, such as is indicated generally at 88 in Fig. 1 and which may include a bracket member 89 fastened to the central standard 32, with said bracket member 89 carrying an upwardly directed member 90 having slidably mounted thereon, in a keyed or non-rotative manner, sleeve 91 which can be vertically adjusted along the vertical rod 90 to any desired position and locked there by thumb-operable set screw means 92. The lower end of the cylindrical sleeve 91 carries a pivotally mounted yoke member 93 which has an upwardly directed extension 94 provided with an inwardly directed saw engaging tip 95 adapted to be drawn against the side of the saw blade 67 by means of threaded engagement of a wing nut 96 with the end of a threaded screw 97, which is carried by the upper end of the cylindrical sleeve 91 and which has its outer end extending through an aperture in the upwardly directed member 94. Thus, it will be seen that the thumb screw 96 may be tightened when the saw blade stabilizing means 88 is in the position shown in Fig. 1, which will have the effect of forcing the saw blade engaging tip 95 against the side of the saw blade 67, thus reinforcing and stabilizing it in the saw tooth sharpening region 29. The adjustable features of this saw blade stabilizing means 88 make it suitable for cooperation with virtually any type of straight saw.

It should also be noted that a hex head wrench adapted for operating any of the recessed socket screws fastening various elements of the device together, is indicated at 98 and is carried by a mounting spring bracket 99 carried by the central standard 32. It should also be noted that the central standard 32 carries another horizontally directed threaded screw 100, which has threadedly mounted thereon a centrally threadedly apertured and cylindrically flanged member indicated generally at 101, the purpose of which will be explained hereinafter in the specific description of the modification of the invention illustrated in Fig. 8.

Fig. 8 illustrates a slight modification of the invention and similar parts will be indicated by the same reference numerals followed by the letter "A." In this modification, the member 101 shown in Fig. 1 is indicated by the reference numeral 101A in Fig. 8 and has its circular disc-shaped portion 109 threadedly carried by the threaded screw 100A, which has its outer end extending through the central aperture 110 in a circular saw 111, which is effectively retained in the proper saw sharpening position, as shown in Fig. 8, by an interiorly threaded conical member 112 which is threaded on the outer end of the threaded screw 100A and screwed inwardly into the aperture 110 in the circular saw 111. This has the effect of forcing the circular saw 111 against the circular edge of the cylindrical flange 113 of the member 101A and positively locking the entire circular saw 111 in the proper sharpening position shown in Fig. 8.

Fig. 9 merely illustrates a slightly different type of saw tooth edge 51B, shown in fragmentary form, wherein the edge of the abrasive disc 23B of the grinding wheel means 20B is not only inclined in opposite directions about a vertical axis between the sharpening of every other opposed pair of the saw teeth along the saw in successive saw tooth sharpening operations, but is also inclined about the axis of the interconnecting member, such as the interconnecting member 22 shown in the first form of the invention, in order to provide the proper and different inclinations for every other intermittent opposed pair of teeth along this type of saw blade, which might, for example, comprise what is known in the art as a rip saw, wherein every other saw tooth is bent or inclined outwardly from the plane of the saw blade.

Numerous modifications and variations of the present invention will occur to those skilled in the art after a careful study hereof. All such, properly within the basic spirit and scope of the present invention are intended to be included and comprehended herein as fully as if specifically described, illustrated, and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

We claim:

1. Saw sharpening apparatus, comprising: grinding wheel means; electric motor means; an interconnecting member rotatably carrying said grinding wheel means and also carrying said motor means in drivingly coupled relationship to said grinding wheel means; mounting means including a first pivot means effectively mounting said interconnecting member for manually controlled rotation around its longitudinal axis for adjusting the plane in which the grinding wheel means lies with respect to a saw tooth sharpening region, said first pivot means including a split journal member carrying therethrough a portion of said interconnecting member and additionally including fastening means for controllably tightening and loosening said split journal member with respect to said interconnecting member, said mounting means also including a second pivot means effectively mounting said interconnecting member for manually controlled substantially vertical pivotal movement of said grinding wheel means toward and away from said saw tooth sharpening region, said second pivot means including a substantially horizontal shaft and encompassing intermediate journal member effectively connected to said split journal member, said mounting means also including a third pivot means effectively mounting said interconnecting member for manually controlled rotation around a substantially vertical axis for adjusting the plane in which the grinding wheel means lies with respect to a saw tooth sharpening region, said third pivot means including a substantially horizontal support plate, a substantially horizontally directed pivotal arm positioned above said support plate, and an interconnecting pivot pin pivotally mounting one end of said arm with respect to said plate, said arm being effectively connected to said intermediate journal member adjacent said pivot pin and having a free end adjustably fastenable with respect to said horizontal support plate in any desired arcuate position with respect thereto, within predetermined limits; and saw mounting means adapted to effectively movably mount a saw to be sharpened with a saw tooth edge thereof positioned in said saw tooth sharpening region for intermittent movement of said saw-tooth edge through said saw tooth sharpening region for successive sharpening of a plurality of saw teeth along said saw tooth edge of said saw; manually controllably operable saw tooth edge advancing means intermittently forcibly cooperable with succeeding saw teeth of a saw for intermittently successively advancing same through said saw tooth sharpening zone after each saw tooth sharpening operation, said saw tooth edge advancing means consisting of a spring biased member pivotally mounted about an axis substantially transverse to the direction of advancing movement of the saw tooth edge of said saw and adjacent to said saw tooth sharpening region, and adjusting means for adjusting the amplitude of each individual saw tooth advancing operation of said saw tooth edge advancing means to adjust for saw teeth of different width.

2. Saw sharpening apparatus, comprising: grinding wheel means; electric motor means; an interconnecting member rotatably carrying said grinding wheel means and also carrying said motor means in drivingly coupled relationship to said grinding wheel means; mounting means including a first pivot means effectively mounting said interconnecting member for manually controlled rotation around its longitudinal axis for adjusting the plane in which the grinding wheel means lies with respect to a saw tooth sharpening region, said first pivot means including a split journal member carrying therethrough a portion of said interconnecting member and additionally including fastening means for controllably tightening and loosening said split journal member with respect to said interconnecting member, said mounting means also including a second pivot means effectively mounting said interconnecting member for manually controlled substantially vertical pivotal movement of said grinding wheel means toward and away from said saw tooth sharpening region, said second pivot means including a substantially horizontal shaft and encompassing intermediate journal member effectively connected to said split journal member, said mounting means also including a third pivot means effectively mounting said interconnecting member for manually controlled rotation around a substantially vertical axis for adjusting the plane in which the grinding wheel means lies with respect to a saw tooth sharpening region, said third pivot means including a substantially horizontal support plate, a substantially horizontally directed pivotal arm positioned above said support plate, and an interconnecting pivot pin pivotally mounting one end of said arm with respect to said plate, said arm being effectively connected to said intermediate journal member adjacent said pivot pin and having a free end adjustably fastenable with respect to said horizontal support plate in any desired arcuate position with respect thereto, within predetermined limits; and saw mounting means adapted to effectively movably mount a saw to be sharpened with a saw tooth edge thereof positioned in said saw tooth sharpening region for intermittent movement of said saw-tooth edge through said saw tooth sharpening region for successive sharpening of a plurality of saw teeth along said saw tooth edge of said saw, said saw mounting means consisting of a longitudinal substantially horizontal carriage member and rollers horizontally slidably mounting same and adapted to carry a longitudinal saw with a longitudinal saw tooth edge thereof positioned substantially horizontal and upwardly directed with a portion thereof lying in said saw tooth sharpening region for intermittent substantially horizontal movement therethrough after each successive saw tooth sharpening operation; manually controllably operable saw tooth edge advancing means intermittently forcibly cooperable with succeeding saw teeth of a saw for intermittently successively advancing same through said saw tooth sharpening zone after each saw tooth sharpening operation, said saw tooth edge advancing means consisting of a spring biased member pivotally mounted about an axis substantially transverse to the direction of advancing movement of the saw tooth edge of said saw and adjacent to said saw tooth sharpening region, and adjusting means for adjusting the amplitude of each individual saw tooth advancing operation of said saw tooth edge advancing means to adjust for saw teeth of different width.

3. Saw sharpening apparatus, comprising: grinding wheel means; electric motor means; an interconnecting member rotatably carrying said grinding wheel means and also carrying said motor means in drivingly coupled relationship to said grinding wheel means; mounting means including a first pivot means effectively mounting said interconnecting member for manually controlled rotation around its longitudinal axis for adjusting the plane in which the grinding wheel means lies with respect to a saw tooth sharpening region, said first pivot means including a split journal member carrying therethrough a portion of said interconnecting member and additionally including fastening means for controllably tightening and loosening said split journal member with respect to said interconnecting member, said mounting means also including a second pivot means effectively mounting said interconnecting member for manually controlled substantially vertical pivotal movement of said grinding wheel means toward and away from said saw tooth sharpening region, said second pivot means including a substantially horizontal shaft and encompassing intermediate journal member effectively connected to said split journal member, said mounting means also including a third pivot means effectively mounting said interconnecting member for manually controlled rotation around a substantially vertical axis for adjusting the plane in which the grinding wheel means lies with respect to a saw tooth sharpening region, said third pivot means including a substantially horizontal support plate, a substantially horizontally directed pivotal arm positioned above said support plate, and an interconnecting pivot pin pivotally mounting one end of said arm with respect to said plate, said arm being effectively connected to said intermediate journal member adjacent said pivot pin and having a free end adjustably fastenable with respect to said horizontal support plate in any desired arcuate position with respect thereto, within predetermined limits; and saw mounting means adapted to effectively movably mount a saw to be sharpened with a saw tooth edge thereof positioned in said saw tooth sharpening region for intermittent movement of said saw-tooth edge through said saw tooth sharpening region for successive sharpening of a plurality of saw teeth along said saw tooth edge of said saw, said saw mounting means consisting of adjustable pivotal mounting means controllably pivotally mounting a circular saw with a portion of the circular saw tooth edge thereof positioned in said saw tooth sharpening region for intermittent substantially circular movement therethrough after each successive saw tooth sharpening operation; manually controllably operable saw tooth edge advancing means intermittently forcibly cooperable with succeeding saw teeth of a saw for intermittently successively advancing same through said saw tooth sharpening zone after each saw tooth sharpening operation, said saw tooth edge advancing means consisting of a spring biased member pivotally mounted about an axis substantially transverse to the direction of advancing movement of the saw tooth edge of said saw and adjacent to said saw tooth sharpening region, and adjusting means for adjusting the amplitude of each individual saw tooth advancing operation of said saw tooth edge advancing means to adjust for saw teeth of different width.

References Cited in the file of this patent

UNITED STATES PATENTS

| | | |
|---|---|---|
| 2,333,298 | Daggett | Nov. 2, 1943 |
| 2,483,336 | Deyarmond | Sept. 27, 1949 |
| 2,535,439 | McEwan | Dec. 26, 1950 |
| 2,811,874 | Rethoret | Nov. 5, 1957 |
| 2,870,657 | Hogue | Jan. 27, 1959 |

FOREIGN PATENTS

| | | |
|---|---|---|
| 33,481 | Switzerland | May 2, 1905 |
| 293,503 | Switzerland | Dec. 16, 1953 |